United States Patent [19]

Takeguchi et al.

[11] Patent Number: 5,178,373
[45] Date of Patent: Jan. 12, 1993

[54] MULTI-CHAMBER FLUID FILLED VIBRATION INSULATOR

[75] Inventors: Hajime Takeguchi, Atsugi; Nobuaki Fujiwara, Yokohama, both of Japan

[73] Assignee: Nissan Motor Co., Ltd., Yokohama, Japan

[21] Appl. No.: 721,768

[22] Filed: Jun. 28, 1991

[30] Foreign Application Priority Data

Jun. 29, 1990 [JP] Japan ................................ 2-172435

[51] Int. Cl.⁵ ................................................ F16F 5/00
[52] U.S. Cl. ................................ 267/140.12; 267/35; 267/219
[58] Field of Search ................. 267/140.1 C, 140.1 A, 267/140.1 R, 219, 220, 35; 180/300, 312, 902; 248/638, 562, 636

[56] References Cited

U.S. PATENT DOCUMENTS

| | | | |
|---|---|---|---|
| 4,836,513 | 6/1989 | Kramer et al. | 267/140.1 A |
| 4,838,529 | 6/1989 | Orikawa et al. | 267/140.1 C |
| 4,872,650 | 10/1989 | Tabata et al. | 267/219 X |
| 4,893,797 | 1/1990 | Le Fol et al. | 267/140.1 A |
| 4,919,400 | 4/1990 | Tabata et al. | 267/140.1 C |
| 4,925,162 | 5/1990 | Kojima | 267/219 X |
| 4,936,555 | 6/1990 | Ishiyama et al. | 267/219 X |
| 5,029,825 | 7/1991 | Doi | 267/219 X |
| 5,035,407 | 7/1991 | Takeguchi et al. | 248/562 X |
| 5,037,071 | 8/1991 | Takano et al. | 267/219 X |
| 5,037,073 | 8/1991 | Matsumoto et al. | 248/636 X |
| 5,040,774 | 8/1991 | Veverka et al. | 267/140.1 C |
| 5,054,752 | 10/1991 | Tabata | 267/140.1 C |

FOREIGN PATENT DOCUMENTS 0042227 2/1990 Japan ............................ 267/140.1 C Primary Examiner—Douglas C. Butler
Attorney, Agent, or Firm—Foley & Lardner

[57] ABSTRACT

In order to prevent relative displacement between two elements which form part of a separation assembly used to define first and second auxiliary chambers within a fluid filled vibration insulator, the two members are fixedly connected together prior assembly.

7 Claims, 10 Drawing Sheets

MULTI-CHAMBER FLUID FILLED VIBRATION INSULATOR

BACKGROUND OF THE INVENTION

1. Field of the Invention

The present invention relates generally to a vibration insulator of the fluid filled type which includes a main working chamber and a plurality of auxiliary chambers and associated orifice passages, and more specifically to such a type of insulator which features a partition construction which is used to define the auxiliary chambers and which increases the sealing therebetween.

2. Description of the Prior Art

FIG. 11 shows an vibration insulator of the nature disclosed in JP-A-2-42227, which finds particular application in suspension arrangements which are used to support an internal combustion engine on an automotive chassis.

As shown, this type of insulator 100 comprises inner and outer tubular members 102, 104 and an elastomeric body 106 which is disposed therebetween. The elastomeric body 106 is apertured in a manner which defines a main working chamber 108, the volume of which varies with the vibration induced relative displacement between the inner and outer members 102, 104.

The construction further includes: first and second orifice or control passages 110, 114 which extend about the inner periphery of the outer member 104 and which respectively establish fluid communication between the main working chamber 108 and first and second auxiliary or expansion chambers 112, 116. The first orifice or control passage 110 is dimensioned to produce a fluid flow resistance which enables the slug of working fluid contained therein, to resonate in response to a relatively low frequency high amplitude type vibration (e.g. frequ=10 Hz, amp ±1 mm) and thus enable engine shake type vibration to be damped effectively.

On the other hand, the second orifice passage is dimensioned so that the slug of working fluid therein resonates in response to the application of a vibration having a frequency of 20–30 Hz and an amplitude of approximately ±0.3 mm. Viz., a vibration of the nature produced when an internal engine is idling.

This construction enables two different types of engine vibration to be effectively attenuated.

With this type of vibration insulator, the first and second auxiliary chambers can be defined by a partitioning assembly of the nature generally denoted by the numeral 126 and which, as shown in FIG. 12, is comprised of first and second elements 120 and 122 formed by press working sheet metal, and which are arranged to be fitted one on the other.

However, with the above type of partition assembly construction, in the event that the two members 120, 122 are not fitted together in exactly the correct manner and the device is assembled with the deviation uncorrected, the slight misalignment therebetween can lead to the formation of small gaps and leakage which results in a loss of vibration damping efficiency.

SUMMARY OF THE INVENTION

It is an object of the present invention to provide a multi-auxiliary chamber type fluid filled vibration insulator of the above described type which features an auxiliary chamber partitioning arrangement which prevents leakage between the two auxiliary chambers.

In brief, the above object is achieved by an arrangement wherein two elements which form a separation assembly used to define first and second auxiliary chambers within the insulator, are fixedly connected together prior assembly and thus prevent any undesirable relative displacement which may lead to imperfect sealing between the two chambers.

More specifically, a first aspect of the present invention comes in a vibration insulator which features: first and second bodies, said first body being adapted for connection to a vibrating body and second body being adapted for connection to a support body; an elastomeric body interconnecting the first and second bodies, said elastomeric body being formed with a recess which defines a chamber which can be filled with a working fluid; a partition assembly which can inserted into the recess formed in said elastomeric body in a manner which divides the chamber into a main working chamber and first and second auxiliary chambers, said partition assembly comprising: a shaped separation plate and a partition member which is fixedly connected to the separation plate at a predetermined location, said partition member partitioning a space defined within said shaped separation plate into the first and second auxiliary chambers, said partition member being defined in part by a metallic component and an elastomeric member, the elastomeric member being fixedly attached to the metallic component; and means defining a plurality of control passages which fluid interconnect said main fluid chamber and said plurality of auxiliary chambers.

DETAILED DESCRIPTION OF THE PREFERRED EMBODIMENTS

FIGS. 1 to 5 show a first embodiment of the present invention. In this arrangement a vibration insulator 10 includes inner and outer tubular members 12 & 14, and an inner essentially annular insert essentially coaxial with the outer tubular member 14. As will be appreciated from FIG. 2, the axial ends of the insert 16 are formed with large diameter portions 16A which are press fitted into snug engagement with a relatively thin elastomeric membrane or layer 14A which is vulcanized to the inner peripheral surface of the outer member 14. This layer forms a hermetic seal which prevents loss of working fluid. The axial end portions of the outer member 14 are crimped inwardly to secure the insert 16 within the outer member 14 and prevent relative axial displacement therebetween.

Figure 3:
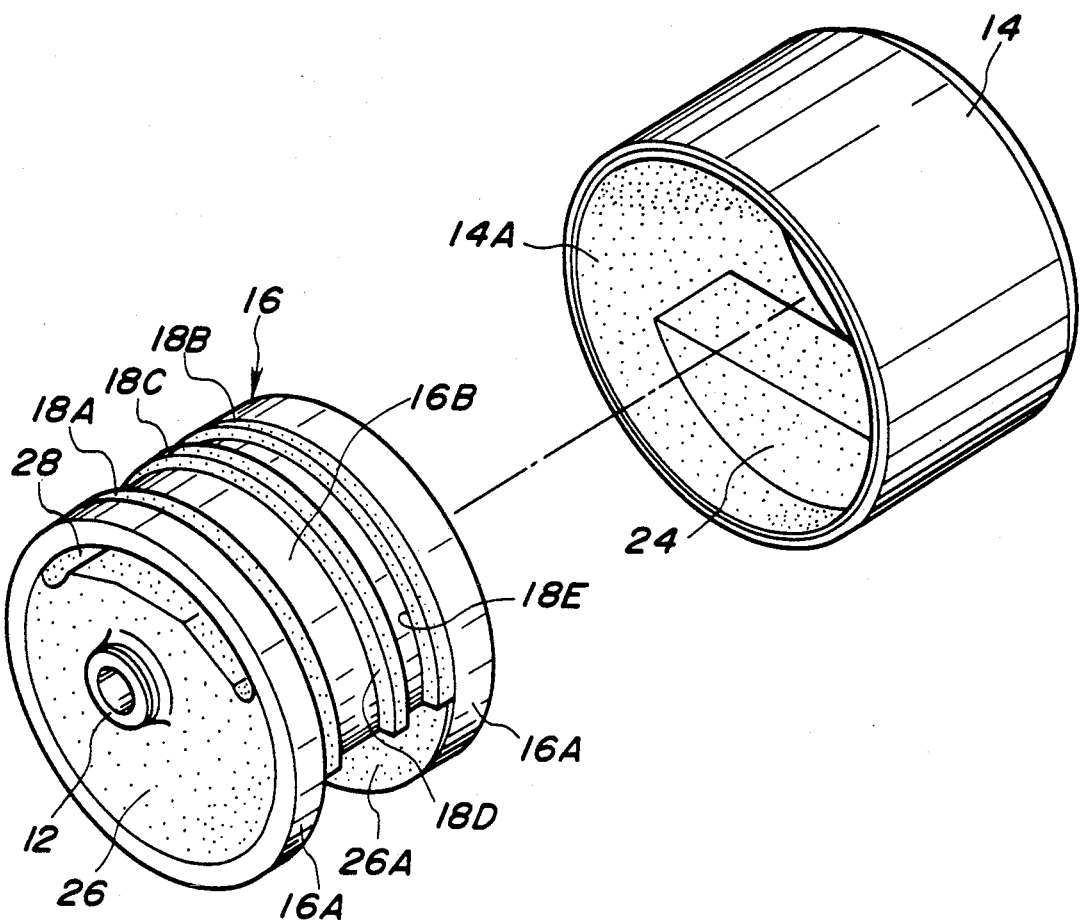
FIG. 3 is an exploded view showing the basic components which make up the first embodiment.
Figure 3:
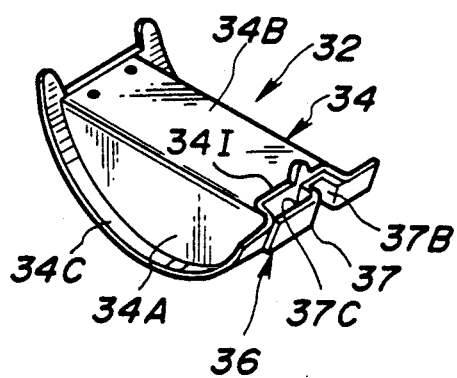

Further, as shown in FIG. 3, an elastomeric body 26 is arranged between the inner and outer members 12, 14 and vulcanized to the inner member 12.

A through hole 14B (see FIG. 2) is formed on the outer member 14 in the illustrated manner and at a location wherein the vulcanized membrane 14A is not secured to the inner periphery of the outer member 14, and arranged to open into an air chamber 25 defined within the outer member 14 by an inwardly deflected diaphragm 24, in a manner which provides constant fluid communication between the air chamber 25 and the ambient atmosphere. As will be appreciated from FIG. 1 part of the membrane 14a is not fixed to the interior surface of the outer member 14 and is arranged to act as the diaphragm 24. The part which acts as the diaphragm 24 is thicker than that part which is vulcanized in place.

The elastomeric body 26 is configured and apertured in a manner which defines: an elongate essentially arcuate cross-section air chamber 28 which is open at both ends to the ambient atmosphere, at a location above the inner member 12 (as seen in the drawings, and an inverted U-shaped concavity 26A (see FIG. 2) at a location which is generally diametrically opposite the elongate air chamber 28.

The concavity 26A, in combination with the diaphragm 24 and the elastomeric membrane 14A, define a hermetically sealed chamber 29 which can be filled with a working fluid. A partitioning assembly generally denoted by the numeral 32 is disposed in the chamber 29 in a manner which closes off a portion of the chamber 29 in a manner which defines a main working chamber 30 (see FIG. 2).

Figure 4:
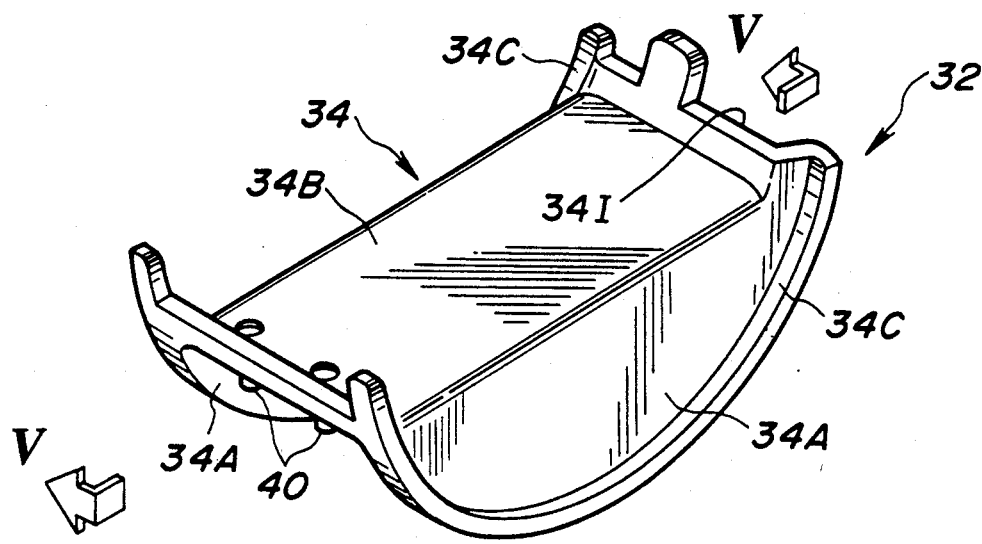
FIG. 4 is an exploded view showing the components which characterize the construction of the first embodiment.
Figure 4:
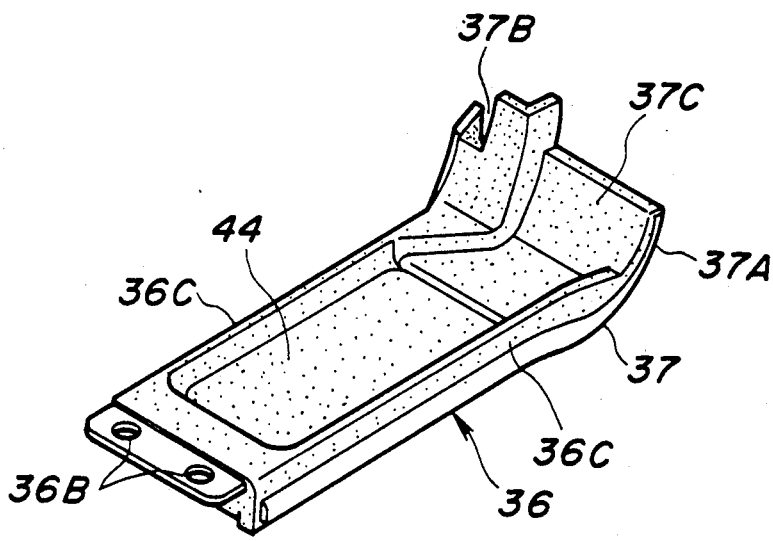

FIG. 4 shows the construction of the partitioning assembly 32 in exploded form. As shown, the arrangement includes a shaped separation plate 34 which is press formed from sheet metal, and a partition 36. A first auxiliary chamber 46 is defined between the partition 36 and the diaphragm 24. The separation plate 34 has two essentially flat, hemi-circular, vertically extending side wall portions 34A which depend down from side edges of an integral intermediate portion 34B. Each of the downwardly extending leg portions 34A is formed with a horizontally outwardly extending flange 34C (see FIG. 4).

Two circular cross-sectional projections 40 are formed integrally on the lower surface of the intermediate or bridge portion 34B in a manner to project down into the space defined between the side wall portions 34A. As will be noted from FIGS. 4 and 5, in this embodiment, these projections 40 are located proximate one end of the bridge portion 34B. A channel-like indent 34I is formed at the other end of the bridge portion 34B.

The partition member 36 is defined by a metallic member 37 which has a elongate opening 36A formed in a central portion thereof and a relatively thick elastomeric member 44 which is vulcanized to the metallic member 37 in a manner which fills the elongate opening 36A and covers a substantial amount of the surface thereof. Two circular openings 36B are formed in one end of the metallic member 37 and are adapted to receive the projections 40. The other end of the metallic member 37 is formed with a curved pawl-like portion 37A which is arranged to cooperate with the channel-like indent 34I. This pawl-like portion 37A has a stepped configuration which defines a narrow U-shaped channel 37B along its outboard surface, and an adjacent surface 37C which spans that part of the channel-like indent 34I not occupied by the narrow U-shaped channel defining portion, in a manner to define a short, relatively short passage.

Figure 5:
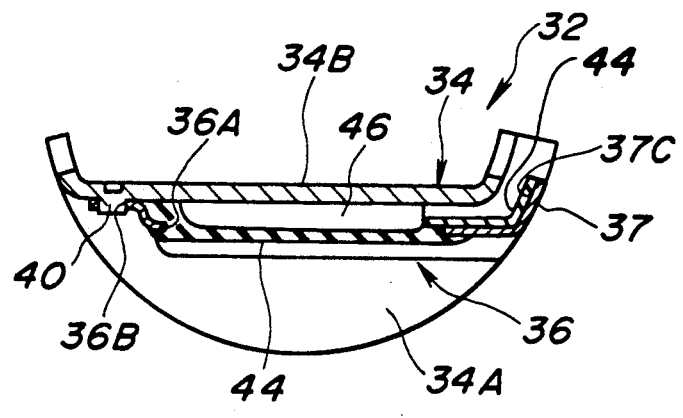
FIG. 5 is a sectional elevation as taken along section line V—V of FIG. 4.

As shown in FIG. 5, the openings 36B formed in partition member 36 are adapted to receive the projections 40 which are formed on the bridge portion 34B. After being fitted into the illustrated position, the ends of the projections are spread or domed in a manner to permanently fix the partition 36 to the separation plate 34.

In addition to this, elastomeric side edge portions 36C defined along the upper side edges of the partition 36 are arranged to press into contact with the side wall portions 34A of the separation plate 34 thus partition off a space which defines a second auxiliary chamber 50.

Returning to FIG. 3, the annular insert member 16 is provided with a small diameter portion 16B. This small diameter portion supports elastomeric strips 18A, 18B and 18C in a predetermined spaced relation with respect to the larger diameter portions 16A. The strips are vulcanized to the surface of the insert in the illustrated manner and so that the spacing between the strips 18A and 18C is larger than the spacing between the strips 18B and 18C. This arrangement defines channels 18D and 18E which extend circumferentially about the insert 16. When fully assembled the strips 18A, 18B and 18C compressively engage the elastomeric membrane 14A.

The two channels 18D and 18E are arranged such that broader of the two (viz.; 18D) leads from the main working chamber 30 to the relatively broad passage section defined between the channel-like indent 34I and the section 37C of the partition 36, which spans the same, in a manner which establishes communication between the main working chamber 30 and the second auxiliary chamber 50 and thus defines a relative broad idle orifice passage 20. On the other hand, channel 18E leads from the main working chamber 30 to the channel-like portion 37B and thus establishes communication with the first auxiliary chamber 46 in a manner which defines a relatively narrow engine shake orifice passage 22.

Figure 1:
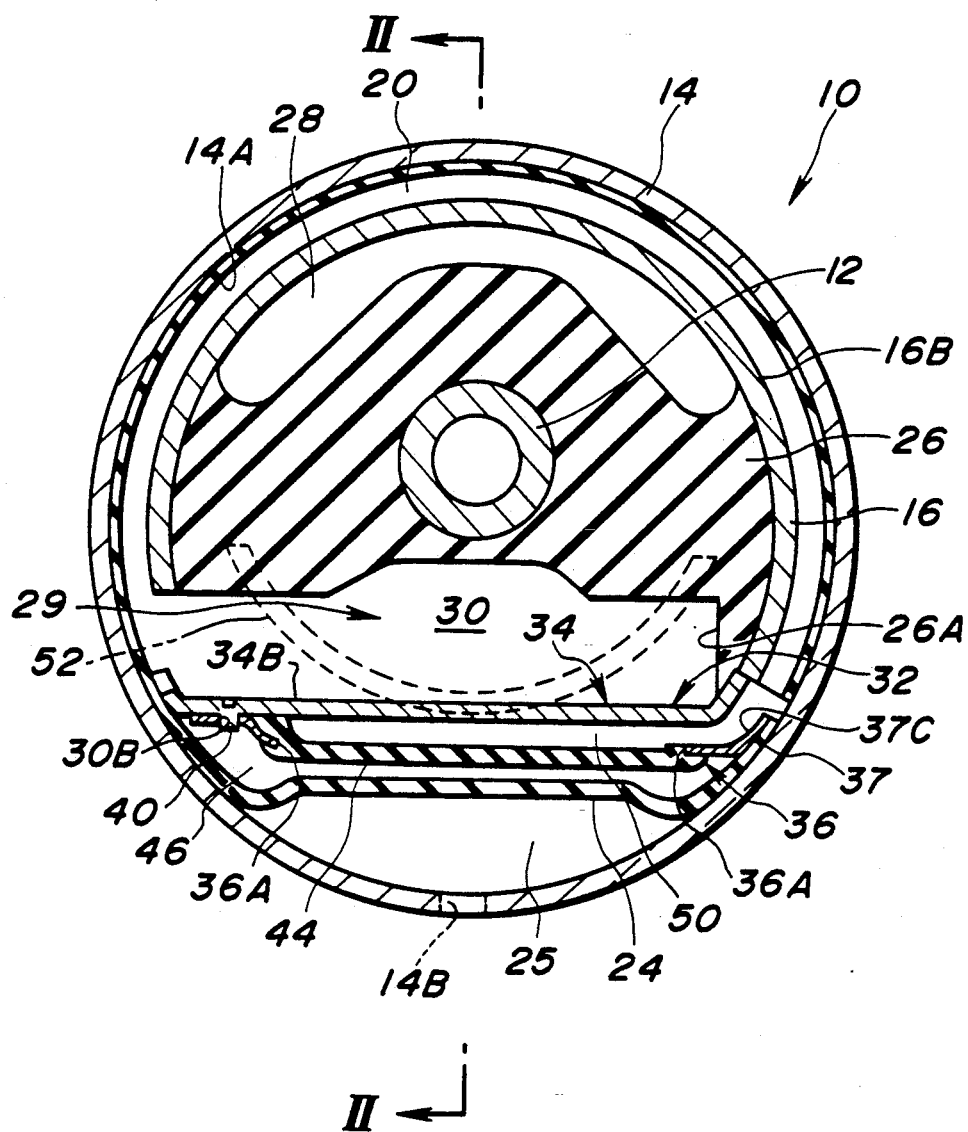
FIG. 1 is a cross-sectional elevation of a first embodiment of the present invention as taken along section line I—I of FIG. 2.
Figure 2:
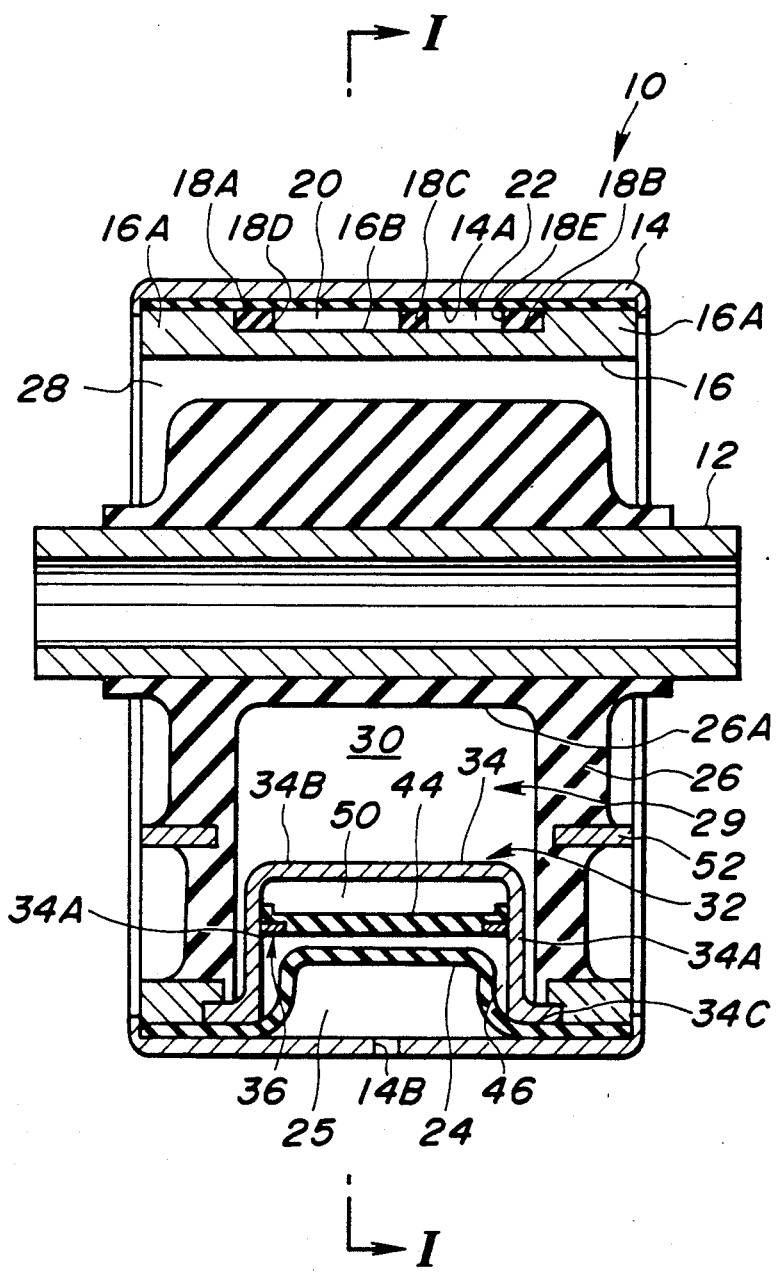
FIG. 2 is a sectional view as taken along section line II—II of FIG. 1.

As will be appreciated from FIGS. 1 and 2, arcuate re-enforcing members 52 are embedded in the elastomeric body 16 at locations on either side of the main working chamber 30 so as to locally increase rigidity and limit the distortion.

The assembly of the above described arrangement is such that three sub-assemblies are produced, the first comprising the inner member 12, insert 16 and elastomeric body 26, the second comprising the partitioning assembly 32, and the third the outer member 14 and elastomeric membrane 14A.

The assembly is carried out while fully immersed in a bath of the working fluid which fills the working and auxiliary chambers. First the sub-assembly comprising the inner member 12, insert 16 and elastomeric body 26 is immersed. Following this, the partitioning assembly 32 is inserted into the inverted U-shaped concavity 26A. It will be noted that as the partition 36 is fixedly connected to the separation plate 34 by way of the projections 40, the two members which comprise the partitioning assembly cannot become displaced with respect to one another in a manner which opens up any unwanted clearances. Next, the thus arranged first and second assemblies are inserted into the outer member 14 and the axial ends of the same are bent inwardly thus completing the assembly.

The completed insulator assembly may be then connected between an engine and a chassis in a manner to act as an engine mount. In this instance the inner member 12 can be secured to the engine via a bolt which passes through the same, while the outer member is force fitted into a suitable bracket which is rigidly connected with the chassis. Of course the situation wherein the inner member is connected to the chassis and the outer member is connected the engine is possible.

Upon the engine moving relative to the vehicle chassis, displacement between the inner and outer members 12, 14 is induced causing fluid to be displaced between the main and auxiliary chambers 30, 25 and 50. When the displacement is induced by engine shake vibration having a relatively low frequency (e.g. 10 Hz) and large amplitude (e.g. ±1 mm) the fluid which is pumped back and forth between the main working chamber 30 and the second auxiliary chamber 50 via the shake orifice passage 22 defines a liquid slug which resonates under such circumstances.

It will be noted that at this time the portion of the partition 36 which is formed by the relatively thick elastomeric member 44, undergoes almost no distortion and that the change in volume of the second auxiliary chamber 50 is very small. Therefore, the amount of fluid flow between the main and second auxiliary chambers 30, 50 via the idle orifice passage 20 is very small and the vibration damping effect provided by the fluid flow in the shake passage 22 is high and effect attenuation of engine shake is rendered possible.

On the other hand, when mount is subject to the relatively high frequency low amplitude vibration (e.g. 20-30 Hz, ±0.3 mm) the liquid contained in the idling orifice passage 20 is excited to the point of undergoing resonance and the relatively thick elastomeric member 44 is induced to flex, thus reducing the dynamic spring constant of the mount and enabling idle vibration to be effectively attenuated.

As the partition 36 is securely connected to the separation plate 34, the problem which is encountered with the prior art wherein leakage tends to occur between the two auxiliary chambers due to slight misalignment of the partitioning elements is eliminated thus eliminating leaks which can reduce the effectiveness of the device.

It will be noted that with the construction of the partitioning assembly which characterizes the first embodiment, it is possible to reduce the size of the assembly and the overall diameter of the insulator. This therefore permits a reduction in the overall size and cost of an engine mount which utilizes the same.

SECOND EMBODIMENT

Figure 6:
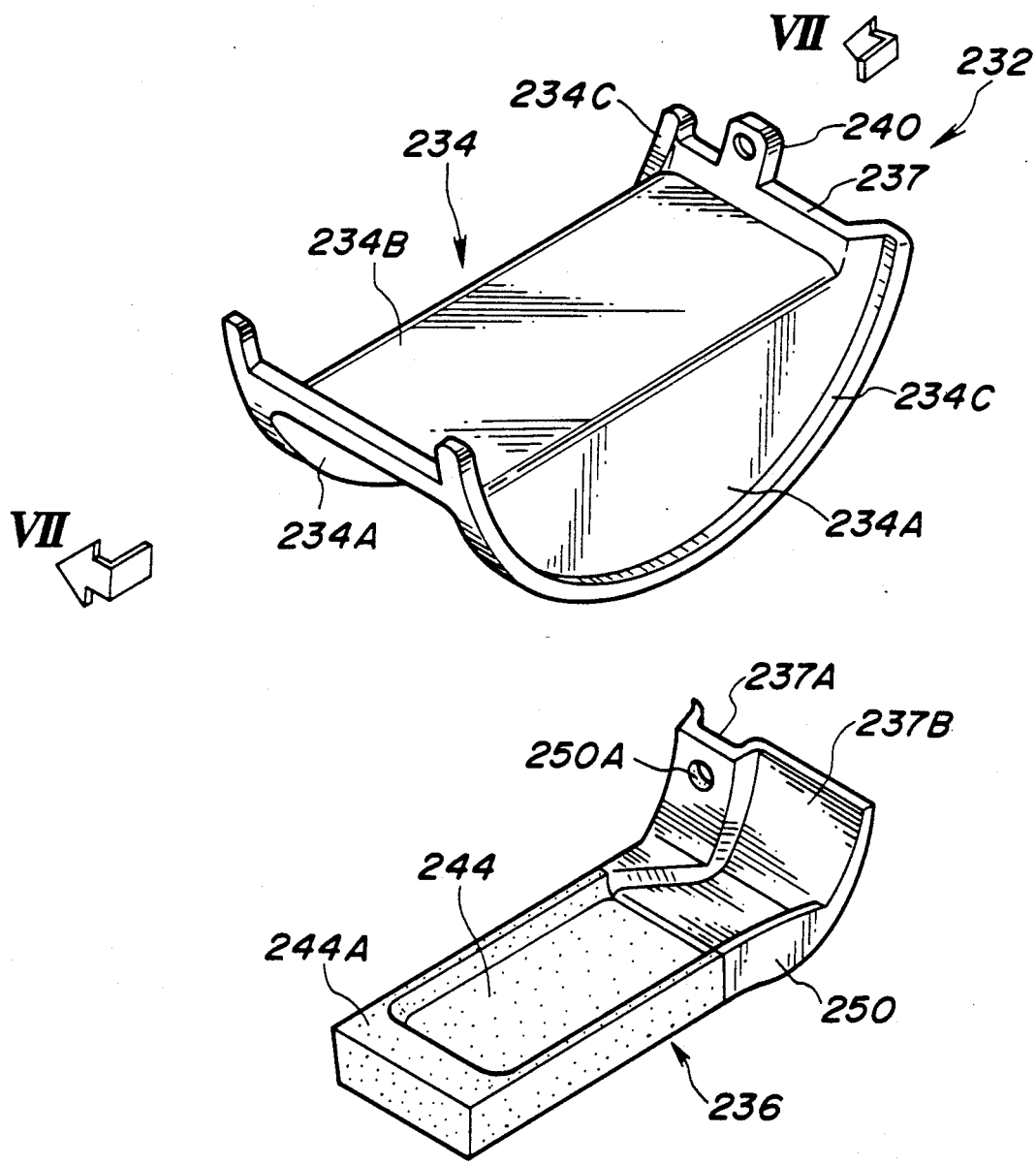
FIG. 6 is an exploded view showing the construction which characterizes a second embodiment of the present invention.
Figure 7:
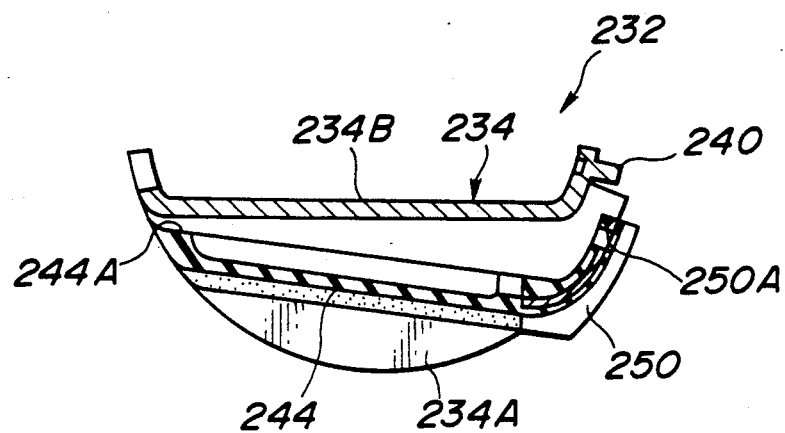
FIGS. 7 and 8 are sectional views as taken along section line VII—VII of FIG. 6 showing the auxiliary chamber defining structure according to the second embodiment.
Figure 8:
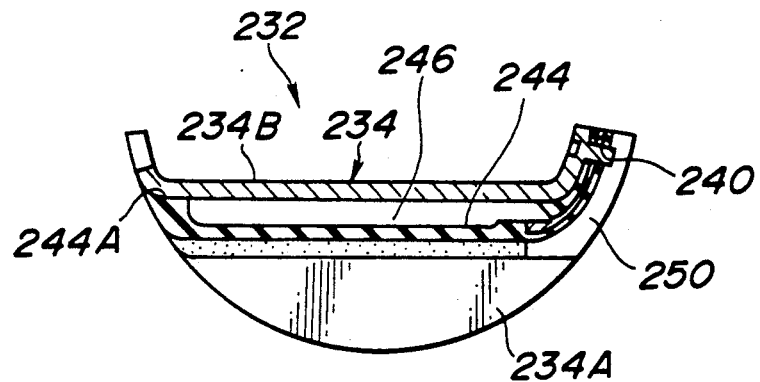

FIGS. 6 to 8 show a second embodiment of the present invention. This embodiment is essentially the same as the first one and differs in that the separation assembly 232 comprises a separation plate 234 which is provided with a channel-like indent portion 237 and a tab-like projection 240 which projects up from the upper edge thereof. The partition member 236 in this instance comprises a relatively short metallic member 250 which is enclosed in one end of a relatively thick elastomeric member 244.

As will be appreciated from FIG. 8 the relatively thick elastomeric member 244 has an end portion 244A which is vulcanize to the lower surface of the bridge portion 234B of the separation plate 234. The metallic member 250 is formed with a through hole 250A which receives a projection 240 which extends from the separation plate. In this instance the end portion 244A is vulcanized in place whereafter the partition is manipulated into position wherein the projection 240 is received in the opening 250A. This procedure pulls the partition up into snug contact with the lower surface of the separation plate. As the partition is secured to the separation plate at two points, relative movement therebetween is securely prevented.

THIRD EMBODIMENT

Figure 9:
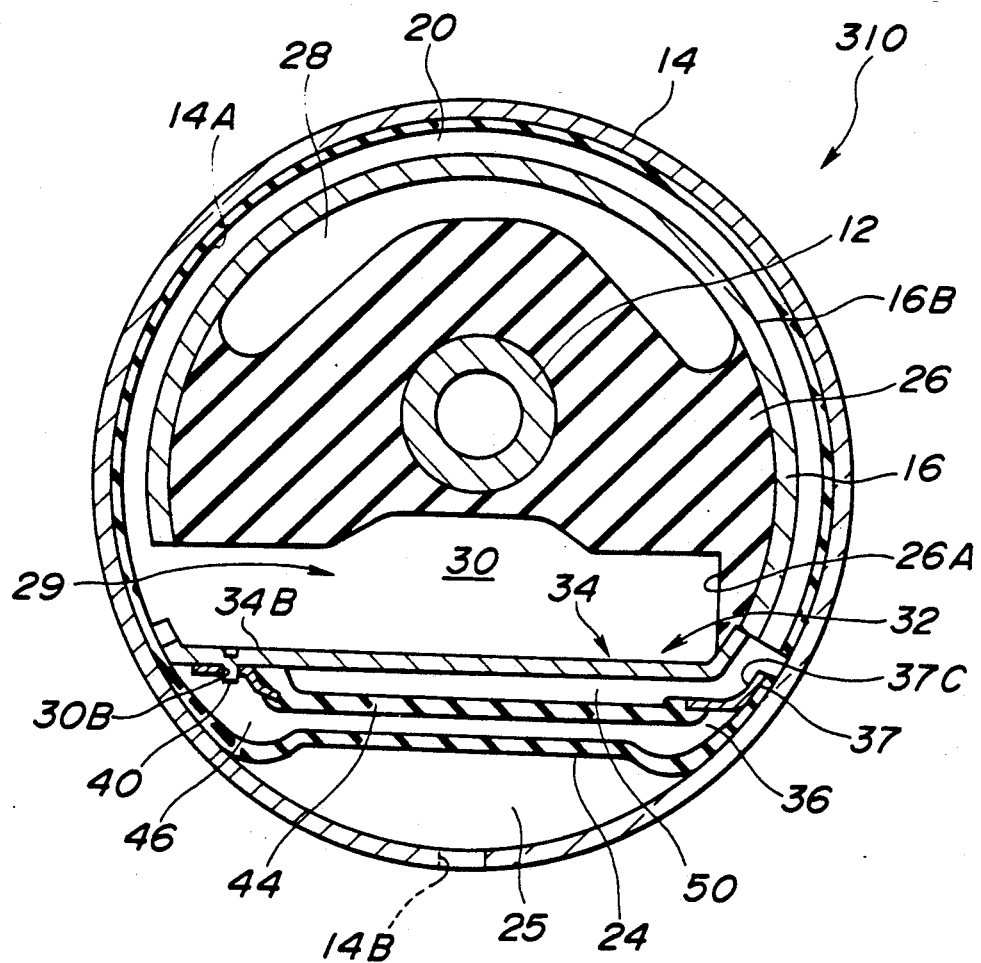
FIGS. 9 and 10 are sectional front and side elevations showing the construction of a third embodiment of present invention.
Figure 10:
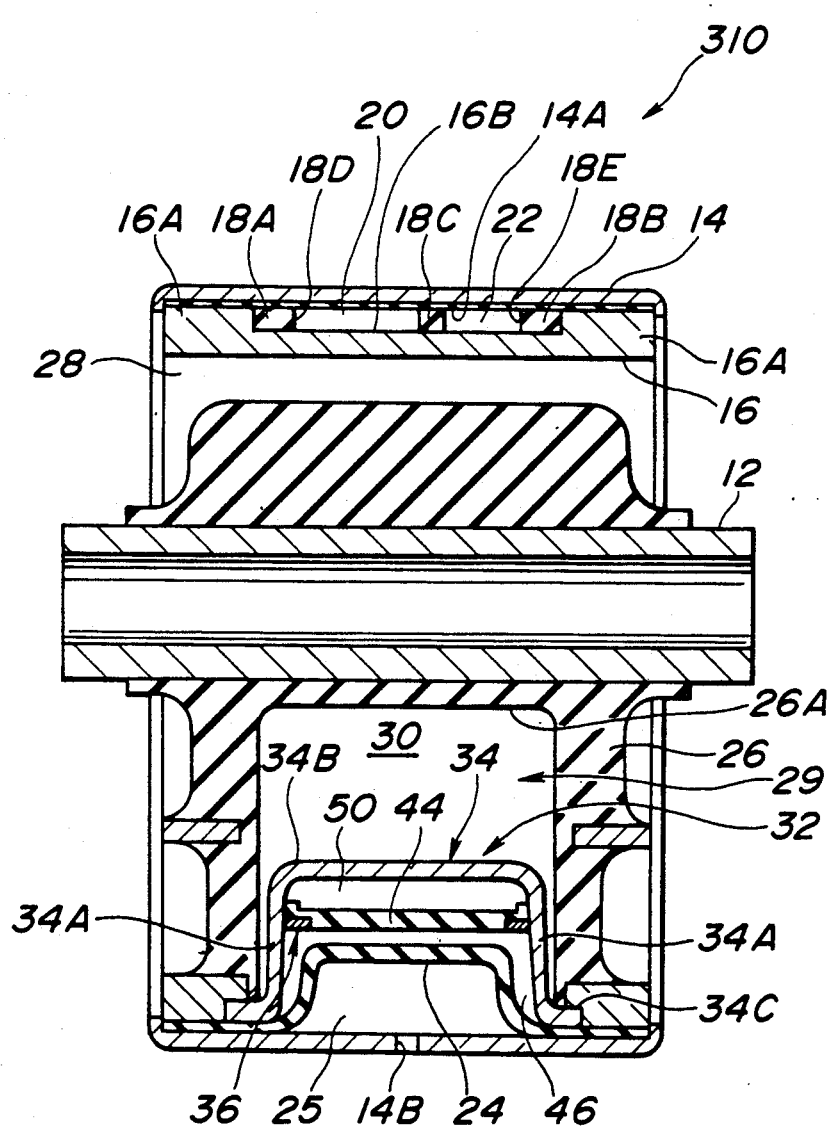
Figure 11:
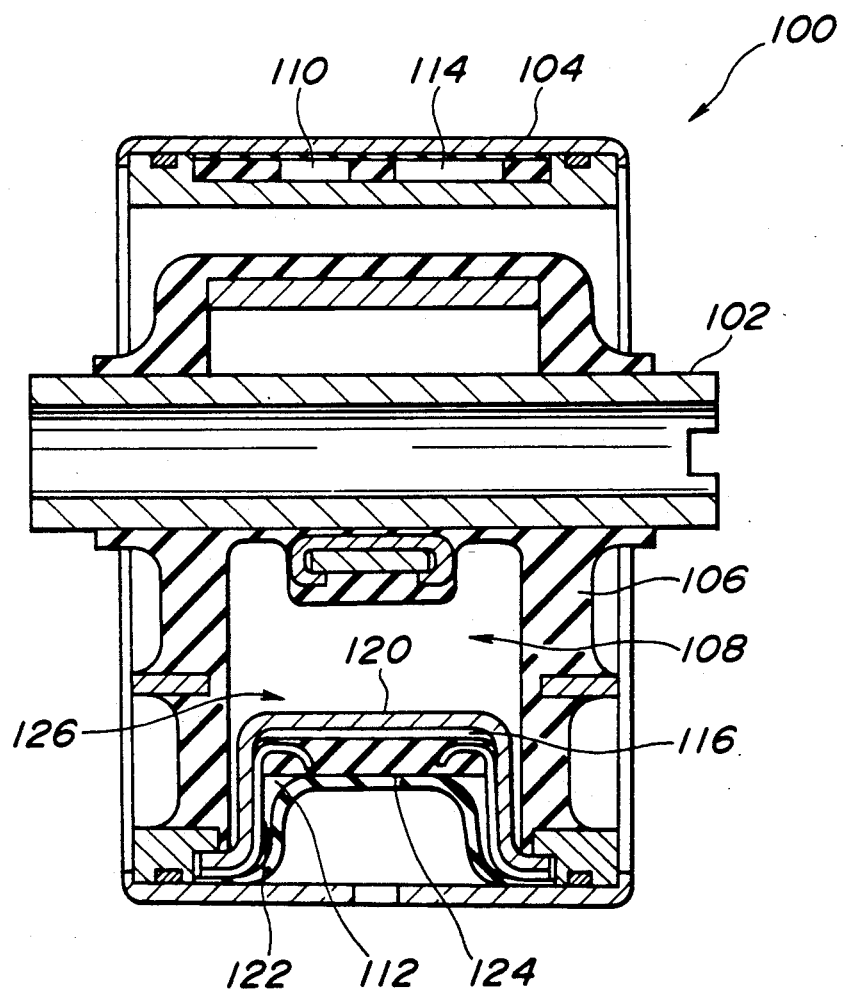
FIGS. 11 and 12 show the prior art arrangement discussed brief in the opening paragraphs of the instant disclosure.
Figure 12:
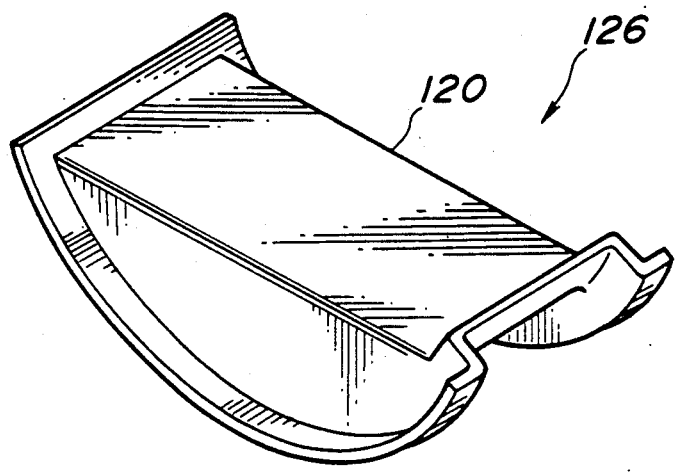
Figure 12:
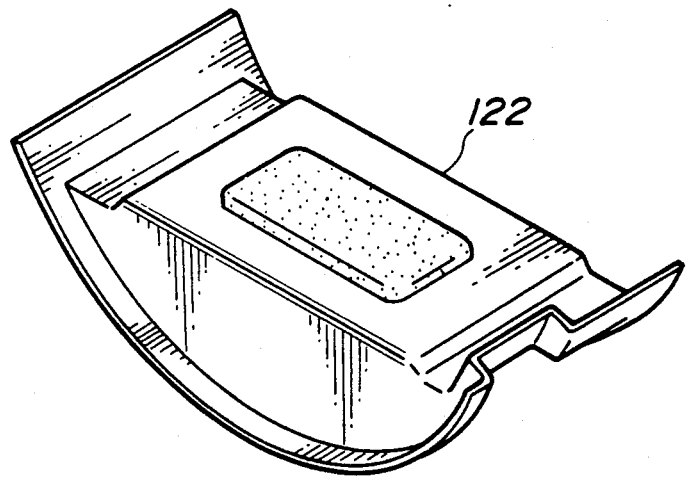

FIGS. 9 and 10 show a third embodiment of the present invention. This embodiment differs from the first one only in that the re-enforcing members 52 are omitted. This omission increases the flexibility of the elastomeric body in a manner which increases the reduction in dynamic spring constant in response to high frequency vibrations and thus enables improved vibration attenuation under such circumstances.

As will be appreciated, the above described embodiments are not limited to engines suspension arrangements and can be used as cab and body mounts if so desired.

What is claimed is:

1. A vibration insulator comprising:
   inner and outer essentially parallel tubular members;
   an elastomeric body having a working-fluid-filled concavity therein and being disposed between the inner and outer tubular members;
   a partition assembly disposed in the concavity, the partition assembly comprising
   (A) a separation plate, the separation plate having two essentially flat side wall portions which depend from side edges of an intermediate portion of said separation plate, the intermediate portion having a channel-like indent formed at an end thereof; and
   (B) a partition member extending between the flat side wall portions of the separation plate and partitioning a space defined between the flat side wall portions into the first and second sections, the partition member including a first rigid member connected to the separation plate and a first flexible member which is secured to the first rigid member, the first rigid member having a shaped portion which cooperates with the channel-like indent formed in the intermediate portion of the separation plate, the shaped portion having a stepped configuration which defines a first channel along its outboard surface, and an adjacent surface which spans a part of the channel-like indent to define a second chamber, the first flexible member having resilient side edge portions which press into contact with the side wall portions of the separation plate to seal off communication between the first and second sections.

2. A vibration insulator as claimed in claim 1 further comprising a re-enforcing member which is embedded in said elastomeric body and arranged to increase the rigidity of the elastomeric body in the vicinity of the conconity which is formed therein.

3. A vibration insulator as claimed in claim 1 further comprising:
   a relatively thin elastomeric membrane fixedly secured to a predetermined portion of the inner peripheral surface of the outer tubular member, the elastomeric membrane having a portion which is not secured to the inner periphery of the tubular member and which acts as a diaphragm for the first section.

4. A vibration insulator as claimed in claim 3 wherein the diaphragm cooperates with the inner periphery of the outer tubular member to define an air chamber.

5. A vibration insulator comprising:
   an inner tubular member;
   and outer tubular member having a through hole therein;
   an inner essentially annular insert being disposed between the inner and outer tubular members and being essentially coaxial with the outer tubular member;
   an elastomeric body having an inverted working-fluid-filled U-shaped concavity and being disposed between the inner and outer tubular members, and secured to the annular insert and the inner tubular member; and
   a partition assembly disposed in the inverted U-shaped concavity to define a main working chamber and first and second auxiliary chambers, the partition assembly comprising
   (A) a separation plate being disposed in the inverted U-shaped concavity to close off a portion thereof and define the main working chamber, the separation plate having two essentially flat side wall portions which depend from side edges of an intermediate portion of the separation plate, the side wall portions having flanges which engage a relatively thin elastomeric membrane disposed on the inner peripheral surface of the outer tubular member, and the intermediate portion having a channel-like indent formed at an end thereof; and
   (B) a partition member extending between the side wall portions which partitions a space defined between the intermediate portion of the separation plate and the elastomeric membrane into the first and second auxiliary chambers, the partition member including a first rigid member connected to the shaped separation plate and a first flexible member which is secured to the first rigid member, the first rigid member having a curved pawl-like portion which cooperates with the channel-like indent formed in the intermediate portion of the separation plate, the pawl-like portion having a stepped configuration which defines a narrow channel along its outboard surface, and an adjacent surface which spans a part of the channel-like indent not occupied by the stepped configuration, thereby defining a short, wide passage, the narrow channel communicating with the first auxiliary chamber and the wide passage communicating with the second auxiliary chamber, and the wide passage communicating with the second auxiliary chamber, the first flexible member having resilient side edge portion which press into contact with the side wall portions of the separation plate to seal off communication between the first and second auxiliary chambers.

6. A vibration insulator comprising:
   an inner tubular member;
   and outer tubular member having a through hole;
   an inner essentially annular insert being essentially coaxial with the outer tubular member;
   a relatively thin elastomeric membrane fixedly secured to a predetermined portion of the inner peripheral surface of the outer tubular member and being in snug engagement with the annular insert;
   an elastomeric body having an inverted working-fluid-filled U-shaped concavity, and being disposed between the inner and outer tubular members and fixed to the inner tubular member;
   wherein the through hole in the outer tubular member is at a discrete location from the predetermined portion to which the elastomeric membrane is secured to the inner peripheral surface of the outer tubular member, the through hole opening into an air chamber defined between the outer tubular member and a diaphragm which is a defined portion of the elastomeric membrane which is not secured to the inner peripheral surface of the outer tubular member;
   wherein the U-shaped concavity is at a location essentially opposite the through hole, and the inverted U-shaped concavity cooperates with the elastomeric membrane to define a hermetically sealed working fluid chamber; and
   a partition assembly disposed in the working fluid chamber to close off a portion of the working fluid chamber and define a main working chamber and first and second auxiliary chambers, the partition assembly comprising
   (A) a shaped press-formed sheet metal separation plate, the separation plate having two essentially flat side wall portions which depends from the side edges of an intermediate portion of the separation plate, the intermediate portion having a channel-like indent formed at an end thereof; and
   (B) a partition member extending between the side wall portions of the separation plate and partitioning a space defined between the separation plate and the diaphragm into the first and second auxiliary chambers, the partition member including a metal member connected to the separation plate and a relatively thick elastomeric member which is secured to the metal member, the metal member having a curved pawl-like portion which cooperates with the channel-like indent formed in the intermediate portion of the separation plate, the pawl-like portion having a stepped configuration which defines a narrow channel along its outboard surface, and an adjacent surface which spans a part of the channel-like indent not occupied by the stepped configuration thereby defining a short, wide passage, the narrow channel communicating with the first auxiliary chamber and the wide passage communicating with the second auxiliary chamber, the elastomeric member having side edge portions which press into contact with the side wall portions of the separation plate to seal off communication between the first and second auxiliary chambers.

7. A bushing type vibration insulator comprising:
   an elastomeric body having a working-fluid-filled concavity;
   inner and outer structural members being operatively connected by the elastomeric body;

a partition assembly, which is disposed in the working-fluid-filled concavity, comprising
a separation plate, the separation plate having two essentially flat parallel cord-shaped side wall portions which depend from side edges of an intermediate portion of the separation plate and which define a space therebetween; and
an elongate tongue-like partition member 1) being connected at one end to the separation plate, 2) extending between the side wall portions, and 3) partitioning the space into first and second sections, the partition member having resilient side edge portions which press into contact with the side wall portions of the separation plate to seal off communication between the first and second sections.

* * * * *